(12) United States Patent
Diamanti et al.

(10) Patent No.: US 8,957,177 B2
(45) Date of Patent: Feb. 17, 2015

(54) COMPOSITIONS COMPRISING AN AMIDE MOIETY CONTAINING POLYOL

(75) Inventors: Steve Diamanti, The Woodlands, TX (US); Howard P. Klein, Austin, TX (US)

(73) Assignee: Huntsman International LLC, The Woodlands, TX (US)

(*) Notice: Subject to any disclaimer, the term of this patent is extended or adjusted under 35 U.S.C. 154(b) by 38 days.

(21) Appl. No.: 13/205,865

(22) Filed: Aug. 9, 2011

(65) Prior Publication Data

US 2013/0041101 A1 Feb. 14, 2013

(51) Int. Cl.
| | | |
|---|---|---|
| C08G 18/10 | (2006.01) | |
| C08G 18/50 | (2006.01) | |
| C09D 175/12 | (2006.01) | |
| C08G 18/46 | (2006.01) | |

(52) U.S. Cl.
CPC ............ *C08G 18/10* (2013.01); *C08G 18/5039* (2013.01); *C09D 175/12* (2013.01); *C08G 18/4615* (2013.01)
USPC .................................. 528/85; 528/44; 528/80

(58) Field of Classification Search
CPC ........... C08G 18/3827; C08G 18/5039; C08G 18/60; C08G 18/603; C08G 18/6423
USPC ............................................... 528/44, 80, 85
See application file for complete search history.

(56) References Cited

U.S. PATENT DOCUMENTS

| | | | |
|---|---|---|---|
| 3,025,323 A | 3/1962 | Ross et al. | |
| 3,786,031 A | 1/1974 | Katayama et al. | |
| 4,153,776 A * | 5/1979 | Friedlander et al. | ............ 528/49 |
| 4,448,905 A | 5/1984 | Lin et al. | |
| 4,822,518 A | 4/1989 | Goel et al. | |
| 8,317,967 B2 * | 11/2012 | Harvey et al. | ............... 156/331.4 |
| 2008/0223519 A1 * | 9/2008 | Locko et al. | ............... 156/331.7 |
| 2011/0059318 A1 | 3/2011 | Harvey et al. | |

OTHER PUBLICATIONS

Sharma, B.; Keul, H.; Hocker, H.; Loontjens, T.; Van Benthem, R. "Synthesis and Characterization of Alternating Poly(Amide-Urethanes) from e-Caprolactone, Diamines, and Diphenyl Carbonate" *Polymer* vol. 46, (2005), p. 1775-1783.

Sharma, R.; Ubaghs, L.; Keul, H.; Hocker, H.; Loontjens, T.; Van Benthem, R. "Microstructure and Properties of Poly(Amide-Urethanes): Comparison of the Reactivity of a-Hydroxy-w-O-pehnyl Urethanes and a-Hydroxy-w-O-hydroxyethyl Urethanes" *Macromolecular Chemistry and Physics*, vol. 205, (2004) p. 1536-1546.

Ubaghs, L.; Waringo, M.; Keul, H.; Hocker, H. "Copolymers and Terpolymers of Tetramethylene Urea, g-Butyrolactone and Ethylene Carbonate or 1,2-Propylene Carbonate" *Macromolecules*, vol. 37, (2004), p. 6755-6762.

Katayama, S.; Horikawa, H.; Ito, Y.; Gomyo, N.; Obuchi, Y. "Synthesis of Alternating Polyamideurethans by Reacting Diisocyanates with N,N'-Di-(6-Hydroxycaproyl)alkylenediamines and N-Hydroxy-alkyl-6-hydroxycaproamide" *Journal of Applied Polymer Science*, vol. 15, (1971), p. 775-796.

Aslzadeh, M. M.; Sadeghi, G. M. M.; Abdouss, M. "Synthesis and Characterization of BHETA Based New Polyurethanes" *Mat-Wiss. U. Werkstofftech* vol. 41, (2010), p. 682-688.

Stapert, H.; Dijkstra, P.; Feijen, J. "Synthesis and Characterization of Aliphatic Poly(ester-Amide)s Containing Symmetrical Bisamide Blocks", *Macromol. Symp.*vol. 130, (1998), p. 91-102.

* cited by examiner

*Primary Examiner* — Michael L Leonard
(74) *Attorney, Agent, or Firm* — Robert A. Diaz

(57) ABSTRACT

The present invention is directed to a composition comprising an amide moiety containing polyol wherein the amide moiety is formed by the reaction of an amine reactive compound with an amine containing compound.

11 Claims, No Drawings

COMPOSITIONS COMPRISING AN AMIDE MOIETY CONTAINING POLYOL

BACKGROUND OF THE INVENTION

1. Field of the Invention

The present invention relates generally to a composition comprising an amide moiety containing polyol.

2. Background Information

It is known in the art that the incorporation of amide moieties into a polyurethane backbone polymer structure can impart certain mechanical and thermal properties to a final end product that comprises the polymer. However, the various processes and methods currently available for incorporating such amide moieties often utilize slow (i.e., >24 hours total) complex chemical reactions that, at times, can require the use of relatively expensive monomers (e.g., cyclic monomers such as caprolactone). All of these factors can contribute to the overall costs associated with the manufacture of amide containing polyurethane polymers and, therefore, there is a need for a process that can address one or more of these shortcomings.

SUMMARY OF THE INVENTION

The present invention is directed to a composition comprising an amide moiety containing polyol wherein the amide moiety is formed by the reaction of an amine reactive compound with an amine containing compound.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "an" amine reactive compound, "an" amine compound, an "isocyanate containing compound", a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

The present invention is directed to a composition that comprises an amide moiety containing polyol. As will be discussed in greater detail below, the amide moiety is formed by the reaction of an amine reactive compound with an amine compound. It should be noted that as used herein, the term "composition" does not include any adhesive compositions such as those urethane adhesive compositions that are known in the art.

Amide Moiety Containing Polyol

The amide moiety containing polyol of the present invention is formed by reacting an amine reactive compound with an amine containing compound. Specifically, the reaction of the amine reactive compound and the amine containing compound yields an amide moiety which is typically incorporated into the backbone of the resulting polyol. As will be discussed in greater detail below, the amide moiety containing polyol reaction product can then be further reacted with other compounds, such as an isocyanate containing compound, in order to make other types of reaction products such as a polyurethane amide containing polymer.

In certain embodiments, the amine reactive compound and the amine containing compound are reacted at a molar ratio ranging from 0.1 to 10:1 such as from 0.2 to 5:1. The amine reactive compound can comprise 1 weight % to 50 weight %, such as from 5 weight % to 30 weight %, of the total reactive ingredients used to form the amide moiety containing polyol while the amine containing compound can comprise 99 weight % to 50 weight %, such as from 95 weight % to 70 weight %, of the total reactive ingredients used to form the amide moiety containing polyol.

The temperature at which the reaction between the amine reactive compound and the amine containing compound can be conducted can range from room temperature (e.g., 25° C.) to 250° C., such as from 50° C. to 150° C. The residence time for the aforementioned chemical reaction can range from 15 minutes to 16 hours.

Suitable amine reactive compounds that may be used in the present invention include, without limitation, lactic acid, lactic acid esters, lactone, glycolic acid, glycolic acid esters, 3-hydroxy butyrate esters, 3-hydroxy butyric acids, castor oil, hydroxy containing fatty acids, hydroxyl containing fatty acid esters, natural oils containing hydroxyl functional groups, or combinations thereof. Examples of suitable lactic acid esters useful in the invention include lactide (3,6-dimethyl-1,4-dioxane-2,5-dione), methyl lactate, ethyl lactate, propyl lactate, iso-propyl lactate, butyl lactate, tert-butyl lactate, iso-butyl lactate, pentyl lactate and the like and combinations thereof. Glycolic acid esters useful in the invention include glycolide (1,4-dioxane-2,5-dione), methyl glycolate, ethyl glycolate, propyl glycolate, iso-propyl glycolate, butyl glycolate, tert-butyl glycolate, iso-butyl glycolate, pentyl glycolate and the like, or combinations thereof.

Lactones suitable for use in the present invention as the amine reactive compound include, without limitation, beta-propiolactone, gamma-butyrolactone, delta-valerolactone, epsilon-caprolactone and the like and combinations thereof. Lactone aminolysis techniques which should be familiar to one skilled in the art may be used to form the amide polyol from lactones and amines. Such techniques may include use of catalysts such as $LiNTf_2$ and/or microwave irradiation. Such techniques are described in Lalli, Claudia et al., *LiNTf₂-Catalyzed Aminolysis of Lactones with Stoichiometric Quantities of Amines*, SYNLETT 2008, No. 2, pp 0189-0192 and Seijas, Julio A. et al., *Solvent-free Ring Opening of ε-Caprolactone with Amines Assisted by Microwave Irradiation*, 11$^{th}$ International Electronic Conference on Synthetic Organic Chemistry (EOSOC-11), 1-30 Nov. 2007, both of which are incorporated herein in their entirety.

Suitable amine compounds that may be used in the present invention as the amine containing compound include, without limitation, di-functional amines, polyfunctional amines, or combinations thereof. For example, primary amines, secondary amines, or combinations thereof may be used as the amine compound in the present invention. Examples of such amines include, without limitation, those selected from the group consisting of N,N'-bis(3-aminopropyl)methylamine, N,N'-dimethylethylene diamine, neopentanediamine, 4,4'-diaminodiphenyl methane and 2-methylpentamethylenediamine (such as DYTEK A available from Invista, Wilmington, Del., U.S.A.). Additionally, polyetheramines (such as JEFFAMINE polyetheramines available from the Huntsman Corporation, The Woodlands, Tex., U.S.A.), may be used in the invention including JEFFAMINE D series having the structure

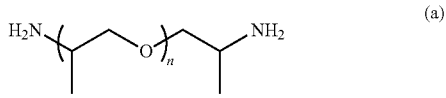

wherein n is 2.5 to 68, JEFFAMINE EDR series having the structure;

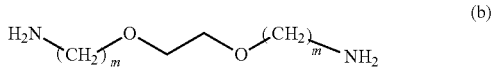

where m is 2 to 3, and JEFFAMINE T series having the structure; or

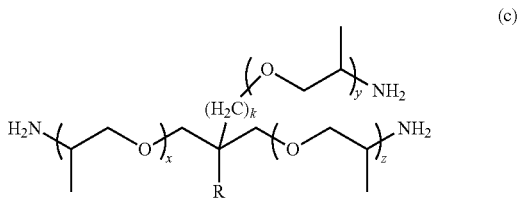

where R is H or $C_2H_5$, k is 0 or 1, and the total of x, y, and z is 5 to 85. In certain embodiments, a combination of (a), (b), and (c) may be used. In addition to the preceding amine compounds, JEFFAMINE D400 and D2000, hexane diamine, butane diamine, ELASTAMINE HT1700, or combinations thereof can also be used as the amine containing compound.

Compositions

As stated above, the composition of the present invention does not include adhesive compositions. The composition of the present invention, however, is directed to an elastomeric composition, a thermoplastic composition, a coating composition, or a sealant composition. One skilled in the art will recognize that a sealant composition is distinct from an adhesive composition and is, therefore, not meant to be synonymous.

In certain embodiments, the composition of the present invention can comprise a compound, such as a polymer compound, which contains a urethane moiety. Accordingly, in some embodiments, the composition can comprise a compound that not only contains a urethane moiety, but the compound can also contain an amide moiety. The compound can be formed by reacting the amide moiety containing polyol described above with an isocyanate containing compound using reaction conditions that are known in the art in order to form a urethane moiety. For example, in certain embodiments, the amide moiety containing polyol and the isocyanate containing compound can be reacted at a temperature ranging from room temperature (e.g., 25° C.) to 150° C., such as from 50° C. to 80° C., for a time ranging from 1 minute to 8 hours, such as from 1 minute to 4 hours. It is noted that the temperatures disclosed in the preceding sentence is the set point temperature of the reactor used and is, therefore, not necessarily the internal temperature of the reaction product that is being formed. While the reactive group ratio of reactive ingredients will be dependent upon the user's needs and desires for the final reaction product, in certain embodiments, the reactive group ratio of amide moiety containing polyol to isocyanate containing compound can range from 0.1 to 10:1, such as from 0.2 to 2:1. As used herein, "reactive group ratio" means the ratio between the number of hydroxyl reactive groups of the amide moiety containing polyol to the number of isocyanate reactive groups of the isocyanate containing compound.

Suitable isocyanate containing compounds that might be used in the preceding paragraph include, without limitation, organic polyisocyanates having a number averaged isocyanate (—NCO) functionality of from at least 1.8 to about 4.0 (e.g., 2.0 to 3.0 or 2.3 to 2.9). In certain embodiments, the organic polyisocyanates have a free isocyanate group content (—NCO content) ranging from 5 weight % to 50 weight % (e.g., 7 weight % to 45 weight % or 8 weight % to 40 weight % or 9 weight % to 35 weight % or 10 weight % to 33.6 weight %) based on the total weight of the isocyanate containing compound. As used herein, "organic polyisocyanate" is meant to encompass isocyanate molecular species having a plurality of organically bound free isocyanate (—NCO) groups. This definition includes, without limitation, organic diisocyanates, triisocyanates, higher functionality polyisocyanates, and combinations thereof.

Accordingly, suitable polyisocyanates that may be used include, without limitation, any of the aliphatic, cycloaliphatic, arylaliphatic, or aromatic polyisocyanates known in the art such as 1,6-hexamethylenediisocyanate, isophorone diisocyanate, 1,4-cyclohexane diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate (4,4'-MDI), 2,4'-diphenylmethane diisocyanate (2,4'-MDI), polymethylene polyphenylene polyisocyanates (crude, or polymeric, MDI), 1,5-naphthalene diisocyanate, or combinations thereof. Moreover, isocyanate-functional polyisocyanate variants, for example, polyisocyanates that have been modified by the introduction of urethane, allophanate, urea, biuret, carbodiimide, uretonimine, isocyanurate, and/or oxazolidone residues can also be used.

In addition to those isocyanate compounds listed in the preceding paragraphs, it is noted that isocyanate terminated pre-polymers may also be used as the isocyanate containing compound. Such prepolymers are generally prepared by reacting a molar excess of polymeric or pure polyisocyanate with one or more polyols. The polyols may include aminated polyols, imine or enamine modified polyols, polyether polyols, polyester polyols, polyamines such as alkanol amines, diols and triols having a molecular weight less than 400, or combinations thereof.

Additionally, in certain embodiments, pseudoprepolymers (also known as semiprepolymers or quasiprepolymers), that are mixtures of an isocyanate terminated prepolymer and one or more monomeric polyisocyanates, may also be used. These polymers can be prepared using techniques that are known in the art.

In certain embodiments, the composition disclosed herein is free of a compound that contains a polyester moiety. That is, no component or compound (e.g., polymeric or monomeric compounds) in the composition contains a polyester moiety. Accordingly, in these embodiments, the composition can be characterized as being free of polyester containing compounds.

In some embodiments, the composition is at least partially foamed. That is, the formation of air or gas bubbles in the composition is intentional and is not an unintended consequence of the formation or curing of the composition. Formation of air or gas bubbles can be accomplished through a variety of ways. In certain embodiments, a chemical or physical blowing agent can be used to foam the composition. As is known in the art, a chemical blowing agent would be a compound that forms bubbles by reacting with one or more of the isocyanate reactive functional groups in the composition. A physical blowing agent, in contrast, would be a compound that changes states (e.g., from a liquid to a gas) when exposed to an external condition such as heat. For example, pentane can change from a liquid to a gas when its boiling temperature is met. The gas is then used to foam the composition. Accordingly, suitable blowing agents can include, without limitation, water, pentane, hydro-fluorocarbon compounds, or combinations thereof. The amount of blowing agent present in the composition will depend on the amount of gas bubbles that the user desires in the compositions. However, in some embodiments, the blowing agent is present at levels ranging from 0.1 weight % to 20 weight % based on the total weight of the composition.

In certain embodiments, after cure, an elastomer (e.g., a polyurethane elastomer) formed from the elastomeric composition disclosed herein has a minimum tear strength of 400 lbs Force/in per ASTM method D624-07 [Type C]. In some embodiments, the composition of the present invention has a tear strength that is at least 200 lbs Force/in (per ASTM method D624-07 [Type C]) greater than a material formed from an analogous composition not containing the amide moiety containing polyol disclosed herein. That is, in the analogous composition, the amide moiety containing polyol is substituted with a conventional polyol, such as a polypropylene glycol based polyol, while all other components in the composition are chemically identical.

In some embodiments, after cure, the glass transition temperature of a material (e.g., a polyurethane material) formed from the composition disclosed herein is at least twenty degrees Celsius higher per the GLASS TRANSITION TEST than a material that is formed from an analogous composition that does not utilize the amide moiety containing polyol of the present invention. That is, in the analogous composition, the amide moiety containing polyol is substituted with a conventional polyol, such as polypropylene glycol based polyol, while all other components in the composition are chemically identical. As used herein, the GLASS TRANSITION TEST means placing a 5 mg sample of a material into a Q2000 differential scanning calorimeter from TA Instruments. The calorimeter was programmed to heat the samples in three cycles. In each cycle, the sample was heated from −70° C. to 200° C. at a rate of 10° C./minute and then the sample was cooled from 200° C. to −70° C. at a rate of 10° C./minute. As stated above, this heating and cooling cycle is conducted three times. The instrument determines the $T_g$ of the sample during the second and third heating cycles by methods known in the art.

The increase in temperature extends the "use temperature" of the material formed by the composition of the present invention thereby allowing it to be used for a wider set of applications. As used herein, "use temperature" means the range of temperatures in which the material maintains its desired physical and mechanical properties for the specific application. By way of illustration, if a container, such as a cup, is made from the composition of the present invention and the user desires the container to hold a liquid that has a temperature of 100° C., then the use temperature of the container will encompasses the 100° C. temperature since the container could be used at that particular temperature without it deforming or softening to the point of non-use. For example, the "use temperature" could range from 25° C. to 105° C. or from 25° C. to 150° C.

In some embodiments, after cure, both the tensile strength and the ultimate elongation properties of a material formed from the composition disclosed herein are higher in value than an analogous system. For example, in some embodiments, after cure, the material that is formed from the composition of the present invention has a tensile strength that is at least 15 PSI greater and an ultimate elongation that is at least 50% greater than a material that is formed from an analogous polyurethane system that does not containing the amide moiety containing polyol per ASTM D412-06. This unexpected result was surprising since most materials would exhibit either high tensile strength and low ultimate elongation or high ultimate elongation and low tensile strength. In case of the present invention, the material exhibited both high tensile strength as well as high ultimate elongation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Therefore, any of the features and/or elements which are listed above may be combined with one another in any combination and still be within the breadth of this disclosure.

EXAMPLES

Example A

Prepolymer Synthesis

The prepolymer was formed by the reaction of PPG 2000 (91.0 grams) with RUBINATE 44 (160.8 grams) in a stirred glass vessel at 80° C. The reaction was allowed to progress for 2.5 hours and the final NCOv was determined to be 20.33%.

Example B

D400 Lactamide Synthesis 288.1 g L-lactide, from PURAC, was added to a three neck, two liter round bottom flask. 880 g JEFFAMINE® D400 was also added to the flask, which was placed on a heating mantle. An overhead stirrer was applied to stir the mixture and a nitrogen line was used to provide an inert environment. A J-Kem temperature control device with sensor was used to adjust the temperature according to a set schedule. The initial temperature was set at 30° C. When the solution temperature had become equal to the set point temperature, the set point temperature was then raised by 10-20° C. and held until the solution temperature became equal to the new set point temperature. This reaction is exothermic so it was common that the solution temperature would exceed the set point. Additionally, the initial slurry gradually becomes a clear solution. The set point was adjusted in this manner up to a 130° C. limit which was held for 2-3 hours. Afterwards, the flask was removed from the heating mantle and allowed to cool at room temperature. The sample was analyzed by FT-IR and NMR spectroscopy to ensure its identity and purity.

Example C

D2000 Lactamide Synthesis 123 g L-lactide, from PURAC, was added to a three neck, two liter round bottom flask. 1700 g JEFFAMINE® D2000 was also added to the flask, which was placed on a heating mantle. An overhead stirrer was applied to stir the mixture and a nitrogen line was used to provide an inert environment. A J-Kem temperature control device with sensor was used to adjust the temperature according to a set schedule. The initial temperature was set at 30° C. When the solution temperature had become equal to the set point temperature, the set point temperature was then raised by 10-20° C. and held until the solution temperature became equal to the new set point temperature. This reaction is exothermic so it was common that the solution temperature would exceed the set point. Additionally, the initial slurry gradually becomes a clear solution. The set point was adjusted in this manner up to a 130° C. limit which was held for 2-3 hours. Afterwards, the flask was removed from the heating mantle and allowed to cool at room temperature. The sample was analyzed by FT-IR and NMR spectroscopy to ensure its identity and purity.

Example D

Hexanediamine Lactamide Synthesis 149 g of L-lactide (from PURAC) and 120 g of hexanediamine (from Sigma-Aldrich) were each added to a three-neck, 2 L flask fitted with a condenser and nitrogen purge. 484 mL of THF solvent were then poured into the flask along with a magnetic stir bar. The flask was then placed in a heating mantle atop a stir plate. A temperature probe, connected to a J-Kem temperature controller, used to regulate the mantle's heat output, was inserted into the mixture and the flask was sealed. Mixing and heating at an initial set point of 25° C. were begun simultaneously. The set point was increased by an additional 10-15° C. when it was matched or exceeded by the actual temperature of the solution. This action was repeated up to a 60° C. limit, owing to the boiling point of THF. The 60° C. temperature was maintained for six hours. Product conversion was tracked and confirmed by FT-IR spectra (FT-IR spectra was obtained using a Nicolet 6700 FT-IR Spectrometer available from Thermo Scientific). The reaction was stopped when no significant change was observed in consecutive sample scans. Afterwards, the flask was removed from the heating mantle and negative pressure was applied for thirty minutes to remove the solvent. 269 g of an off-white solid was recovered and placed in storage.

Example 1

A mixture of Lactamide D2000 (25.0 gram) and Lactamide D400 (25.0 gram) amide polyols, hexanediol chain extender (5.56 gram), along with DABCO crystal (0.0129 gram) catalyst are charged in a 100 g mixing cup of FlackTek DAC150 FVZ-K speed mixer. After a mixing/heating protocol (3500 rpm mixing for 3.5 min, 1 min heating in 80° C. oven, 1 min 3500 rpm mixing, 1 min heating in 80° C. oven, 1 min 3500 rpm mixing), all solids in the polyol mixture are dissolved. RUBINATE 1680 (30.26 gram) is then added into the clear polyol mixture and mixed together for 1.5 min at 3500 rpm. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tear strength by ASTM D-624-07 [Type C].

Comparative Example 1

A mixture of JEFFOL-PPG2000 (24.0 gram) and PPG 400 (24.0 gram) polyol, hexanediol chain extender (5.33 gram), along with DABCO crystal (0.0125 gram) catalyst are charged in a 100 g mixing cup of FlackTek DAC150 FVZ-K speed mixer. After a mixing/heating protocol (3500 rpm mixing for 3.5 min, 1 min heating in 80° C. oven, 1 min 3500 rpm mixing, 1 min heating in 80° C. oven, 1 min 3500 rpm mixing), all solids in the polyol mixture are dissolved. RUBINATE 1680 (35.04 gram) is then added into the polyol mixture and mixed together for 1.5 min at 3500 rpm. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tear strength by ASTM D-624-07 [Type C].

Example 2

A mixture of Lactamide D2000 (15.0 gram) and Lactamide D400 (45.0 gram) amide polyols, along with DABCO crystal (0.0127 gram) catalyst are charged in a 100 g mixing cup of FlackTek DAC150 FVZ-K speed mixer. After a mixing/heating protocol (3500 rpm mixing for 3.5 min, 1 min heating in 80° C. oven, 1 min 3500 rpm mixing, 1 min heating in 80° C. oven, 1 min 3500 rpm mixing), all solids in the polyol mixture are dissolved. RUBINATE 1680 (24.87 gram) is then added into the polyol mixture and mixed together for 1.5 min at 3500 rpm. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tear strength by ASTM D-624-07 [Type C].

Comparative Example 2

A mixture of JEFFOL-PPG2000 (13.0 gram) and JEFFOL-PPG 400 (39.0 gram) polyol along with DABCO crystal (0.0125 gram) catalyst are charged in a 100 g mixing cup of FlackTek DAC150 FVZ-K speed mixer. After a mixing/heating protocol (3500 rpm mixing for 3.5 min, 1 min heating in 80° C. oven, 1 min 3500 rpm mixing, 1 min heating in 80° C. oven, 1 min 3500 rpm mixing), all solids in the polyol mixture are dissolved. RUBINATE 1680 (31.09 g) is then added into the polyol mixture and mixed together for 1.5 min at 3500 rpm. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tear strength by ASTM D-624-07 [Type C].

TABLE 1

Comparative Tear Strength Data for Poly(Urethane-Amides) and Polyurethanes.

| Sample | Average Tear Strength in (lbf/in) |
| --- | --- |
| Example 1 | 879 |
| Comparative Example 1 | 343 |
| Example 2 | 890 |
| Comparative Example 2 | 250 |

Example 3

Lactamide D2000 amide polyol (180.6 grams) in a mass ratio of 9:1 with hexanediamine lactamide (20.2 grams) was reacted in a stirred glass vessel at 80° C. together with RUBINATE 44 (46.1 grams) for 18 minutes. The molar ratio of isocyanate to hydroxy groups was fixed at 1.05. The mixture created thus was poured into a pre-heated aluminum mold to cure at 80° C. overnight. The molded pieces thus synthesized were cut into the proper shape and analyzed for tensile behavior by ASTM D-412-06.

Comparative Example 3

JEFFOL-PPG2000 polyol (180.6 grams) in a mass ratio of 9:1 with hexanediol from Aldrich (20.8 grams) was reacted in a stirred glass vessel at 80° C. together with RUBINATE 44 (69.8 grams) for 5 minutes. The molar ratio of isocyanate to hydroxy groups was fixed at 1.05. The mixture created thus is poured into a pre-heated aluminum mold to cure at 80° C. overnight. The molded pieces thus synthesized were cut into the proper shape and analyzed for tensile behavior by ASTM D-412-06.

Example 4

A mixture of Lactamide D2000 (49.8 grams) and Lactamide D400 amide (149.1 grams) polyols in a mass ratio of 1:3 were reacted in a stirred glass vessel at 80° C. together with the prepolymer of Example A (121.0 grams), formed by the reaction of RUBINATE 44 with JEFFOL-PPG2000 to an NCOv of 20.33, for 15 minutes. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tensile behavior by ASTM D-412-06.

Comparative Example 4

A mixture of JEFFOL-PPG2000 (90.2 grams) and JEFFOL-PPG 400 (30.1 grams) polyols in a mass ratio of 1:3 were reacted in a stirred glass vessel at 80° C. together with the prepolymer of Example A (103.2 grams), formed by the reaction of RUBINATE 44 with JEFFOL-PPG2000 to an NCOv of 20.33, for 15 minutes. The molar ratio of isocyanate to hydroxy groups is fixed at 1.05. The mixture created thus is poured into a pre-heated aluminum mold to cure at 80° C. overnight. The molded pieces thus synthesized were cut into the proper shape and analyzed for tensile behavior by ASTM D-412-06.

TABLE 2

Comparative Tensile Strength Data for Poly(Urethane-Amides) and Polyurethanes.

| Sample | Tensile Strength (psi) | Ultimate Elongation (%) |
|---|---|---|
| Example 3 | 101 | 627 |
| Comparative Example 3 | 27 | 164 |
| Example 4 | 63 | 516 |
| Comparative Example 4 | 44 | 388 |

Example 5

A mixture of Lactamide D2000 (100.2 grams) and Lactamide D400 (100.1 grams) amide polyols in a mass ratio of 1:1 were reacted in a stirred glass vessel at 80° C. together with Rubinate 44 (56.5 grams) for 10 minutes. The molar ratio of isocyanate to hydroxy groups is fixed at 1.05. The mixture created thus is poured into a pre-heated aluminum to cure at 80° C. overnight.

Comparative Example 5

A mixture of JEFFOL-PPG2000 (100.6 grams) and JEFFOL-PPG400 (100.8 grams) polyols in a mass ratio of 1:1 were reacted in a stirred glass vessel at 80° C. together with Rubinate 44 (80.0 grams) for 12 minutes. The molar ratio of isocyanate to hydroxy groups is fixed at 1.05. The mixture created thus is poured into a pre-heated aluminum to cure at 80° C. overnight.

Example 6

A mixture of Lactamide D2000 (51.0 grams) and Lactamide D400 (149.1 grams) amide polyols in a mass ratio of 1:3 were reacted in a stirred glass vessel at 80° C. together with Rubinate 44 (74.0 grams) for 15 minutes. The molar ratio of isocyanate to hydroxy groups is fixed at 1.05. The mixture created thus is poured into a pre-heated aluminum mold to cure at 80° C. overnight.

Comparative Example 6

A mixture of JEFFOL-PPG2000 (50.3 grams) and JEFFOL-PPG400 (149.7 grams) polyols in a mass ratio of 1:3 were reacted in a stirred glass vessel at 80° C. together with Rubinate 44 (104.8 grams) for 11 minutes. The molar ratio of isocyanate to hydroxy groups is fixed at 1.05. The mixture created thus is poured into a pre-heated aluminum mold to cure at 80° C. overnight.

TABLE 3

Comparative Glass Transition Temperatures for Poly(Urethane-Amides) and Polyurethanes.

| Sample | $T_g$ in ° C. |
|---|---|
| Example 5 | 6 |
| Comparative Example 5 | −18 |
| Example 6 | 36 |
| Comparative Example 6 | −2 |

Table 3 shows the large difference in glass transition temperature (Tg) between the amide-polyol containing polyurethanes and the non-amide polyol containing polyurethanes. This difference in Tg causes significant differences in the mechanical behavior of the materials. For example, the amide-polyol containing material from example 6 would be a hard, resilient material at room temperature, while the non amide-polyol containing material would be soft and rubbery at room temperature.

What is claimed is:
1. A molded polyurethane article comprising a polyurethane elastomer that comprises the reaction product of a mixture comprising an isocyanate compound and an amide moiety containing polyol wherein the amide moiety is the reaction product of an amine reactive compound with an amine containing compound wherein the amine reactive compound is selected from the group consisting of 3-hydroxy butyrate esters, 3-hydroxy butyric acids, lactic acid esters, and combinations thereof; wherein the polyurethane elas- tomer is not an adhesive or a coating composition; and wherein the molded polyurethane article has a minimum tear strength of 400 lbs Force/in.

2. The molded polyurethane article according to claim 1, wherein the amine containing compound comprises a primary amine, a secondary amine, or combinations thereof.

3. The molded polyurethane article according to claim 1, wherein the amine containing compound comprises an aliphatic amine.

4. The molded polyurethane article according to of claim 1, wherein the amine containing compound comprises N,N'-bis (3-aminopropyl)methylamine, N,N'-dimethylethylene diamine, neopentanediamine, 4,4'-diaminodiphenyl methane, 2-methylpentamethylenediamine, polyetheramine, or combinations thereof.

5. The molded polyurethane article according to claim 4, wherein the polyetheramine comprises
(a) an amine having the structure

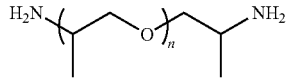

wherein n is about 2.5 to about 68,
(b) an amine having the structure

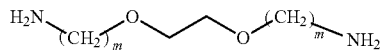

wherein m is about 2 or about 3;
(c) an amine having the structure

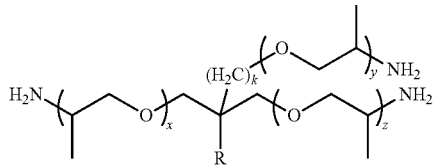

where R is H or $C_2H_5$, k is 0 or 1, and the total of x, y, and z is 5 to 85; or
combinations of (a), (b), and (c).

6. The molded polyurethane article according to claim 1, wherein the composition is at least partially foamed.

7. The molded polyurethane article according to claim 1, wherein the composition is free of compounds containing polyester moieties.

8. The molded polyurethane article according to claim 1, wherein the amine reactive compound is selected from the group consisting of 3-hydroxy butyrate esters, lactic acid esters, and combinations thereof.

9. The molded polyurethane article according to claim 8, wherein the reactive group ratio of the amide moiety containing polyol to isocyanate compound ranges from 0.1 to 10:1.

10. The molded polyurethane article according to claim 9, wherein the isocyanate compound is an isocyanate terminated pre-polymer compound.

11. The molded polyurethane article according to claim 10, wherein the isocyanate terminated pre-polymer is prepared by reacting a molar excess of polymeric polyisocyante with one or more polyols.

* * * * *